United States Patent
Treen et al.

(10) Patent No.: US 6,817,311 B1
(45) Date of Patent: Nov. 16, 2004

(54) PRESSURE INDICATOR

(75) Inventors: Andrew S Treen, Hampshire (GB);
Chris R Lawrence, Hampshire (GB);
Martin Swan, Hampshire (GB); John W Williams, Worcester (GB)

(73) Assignee: Qinetiq Limited, Farnborough (GB)

( * ) Notice: Subject to any disclaimer, the term of this patent is extended or adjusted under 35 U.S.C. 154(b) by 0 days.

(21) Appl. No.: 10/069,461

(22) PCT Filed: Aug. 9, 2000

(86) PCT No.: PCT/GB00/03072
§ 371 (c)(1),
(2), (4) Date: Feb. 26, 2002

(87) PCT Pub. No.: WO01/18517
PCT Pub. Date: Mar. 15, 2001

(30) Foreign Application Priority Data

Sep. 6, 1999 (GB) .............................. 9920885

(51) Int. Cl.⁷ .............................................. G01L 7/08
(52) U.S. Cl. ...................................... 116/270; 116/268
(58) Field of Search ................................. 116/272, 266, 116/268, 281, 282, 283, 270, 212, 273, DIG. 34

(56) References Cited

U.S. PATENT DOCUMENTS

| | | | |
|---|---|---|---|
| 2,325,490 A | | 7/1943 | Elftman ..................... 353/80 |
| 2,536,321 A | | 1/1951 | Smith et al. ............... 220/89.2 |
| 2,938,379 A | | 5/1960 | Reh ........................ 73/146.8 |
| 3,094,239 A | * | 6/1963 | Baker ..................... 220/203.18 |
| 3,119,617 A | * | 1/1964 | Topper ...................... 473/593 |
| 3,602,186 A | * | 8/1971 | Popenoe ...................... 411/13 |
| 3,675,722 A | * | 7/1972 | Balmes, Sr. ................. 169/30 |
| 3,703,879 A | | 11/1972 | Huthsing, Jr. ............... 116/270 |
| 3,738,311 A | * | 6/1973 | Appleton .................... 116/272 |
| 3,850,133 A | * | 11/1974 | Johnson ..................... 116/212 |
| 3,987,668 A | * | 10/1976 | Popenoe ..................... 116/212 |
| 3,987,699 A | * | 10/1976 | Popenoe ..................... 411/13 |
| 4,166,430 A | * | 9/1979 | Johnson, Jr. ................ 116/202 |
| 4,366,708 A | * | 1/1983 | Warihashi ................... 73/146.8 |
| 4,421,124 A | * | 12/1983 | Marshall .................... 600/491 |
| 4,480,580 A | * | 11/1984 | Nalence .................... 116/34 R |
| 4,722,451 A | * | 2/1988 | Conrad ...................... 215/365 |

(List continued on next page.)

FOREIGN PATENT DOCUMENTS

| | | |
|---|---|---|
| DE | 296 16 337 U | 11/1996 |
| EP | 0 001 120 A | 3/1979 |
| GB | 927 0750 | 5/1963 |
| GB | 1 261 048 | 1/1972 |
| GB | 2 069 139 A | 8/1981 |
| GB | 2 086 048 A | 5/1982 |
| GB | 2 229 003 A | 9/1990 |

*Primary Examiner*—Christopher W. Fulton
*Assistant Examiner*—R Alexander Smith
(74) *Attorney, Agent, or Firm*—Nixon & Vanderhye, P.C.

(57) ABSTRACT

A pressure indicator and a corresponding method are disclosed, the pressure indicator comprising a display diaphragm, optionally transparent, and an indicator diaphragm coupled to and in fluid communication with the display diaphragm. In use, pressure is applied to the diaphragms, which may be amplified, whereby a change in the pressure applied causes relative movement between the diaphragms which is observable either on the outer surface of the display diaphragm or through the display diaphragm. The diaphragms may form a compartment preferably containing a liquid or gel. The indicator diaphragm may bear a recognizable configuration or pattern which can be colored and may comprise a symbol or graphic projecting from its surface. The configuration or pattern may comprise at least two components, each component corresponding to a different pressure. Also disclosed is an inflatable device, especially a football or a tire, comprising such a pressure indicator.

22 Claims, 5 Drawing Sheets

U.S. PATENT DOCUMENTS

| | | | |
|---|---|---|---|
| 4,793,751 A | * 12/1988 | Takeuchi et al. | 411/13 |
| 4,877,143 A | * 10/1989 | Travisano | 215/230 |
| 5,014,786 A | * 5/1991 | Kobayashi | 116/272 |
| 5,189,979 A | 3/1993 | Popenoe | 116/273 |
| 5,289,929 A | * 3/1994 | Heilman et al. | 215/230 |
| 5,677,492 A | * 10/1997 | Huang | 73/715 |
| 5,755,634 A | * 5/1998 | Huang | 473/570 |
| 5,827,429 A | * 10/1998 | Ruschke et al. | 210/321.75 |
| 6,089,250 A | * 7/2000 | Johnson | 137/227 |
| 6,470,821 B1 | * 10/2002 | Hagopian | 116/281 |

\* cited by examiner

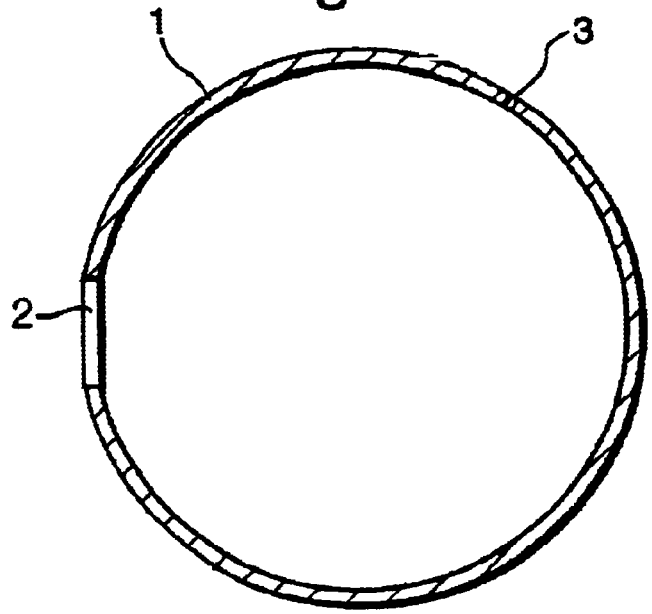
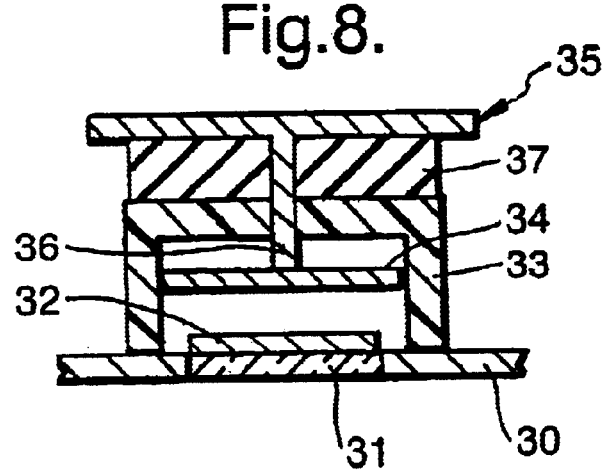

PRESSURE INDICATOR

This application is the US national phase of international application PCT/GB03072 filed 9 Aug, 2000, which designated the US.

BACKGROUND OF THE INVENTION

This invention relates to a pressure indicator.

SUMMARY OF THE INVENTION

According to a first aspect of the present invention, a pressure indicator comprises a display diaphragm and an indicator diaphragm coupled to and in fluid communication with the display diaphragm and forming a compartment with the display diaphragm; wherein, in use, a change in pressure applied to the diaphragms causes relative movement between the diaphragms which is observable either on the outer surface of the display diaphragm or through the display diaphragm. To see through the display diaphragm effectively, it is preferably transparent.

Preferably, a means to amplify the movement between the diaphragms caused by the change in pressure applied to the diaphragms is provided. This would enable small changes in applied pressure to be observable. The means to amplify the movement between the diaphragms may comprise an article having a first surface and a second surface, the second surface having a larger cross sectional area than the first surface, the first surface being in fluid communication with one of the diaphragms. A change in pressure applied to the second surface causes an amplified movement of the first surface which is communicated to the diaphragms. Preferably, the first surface of the article is the indicator diaphragm.

Preferably, the means to amplify the change in pressure applied to the diaphragms is biased so that on removal of the change in pressure applied, the means to amplify the change in pressure returns to its original position i.e. that prior to the application of the pressure. This ensures that an accurate indication of the pressure is obtained. The biasing means may be a spring or elastomeric material.

In a preferred embodiment, the diaphragms form a compartment and contain a liquid or gel which may be at least partially opaque. The compartment may be sealed, alternatively the diaphragms may be in mechanical communication without being sealed.

In another preferred embodiment the indicator diaphragm bears a recognisable configuration or pattrn such that the configuration or pattern is observable either on the outer surface of the display diaphragm or through the display diaphragm thereby aiding observation of the relative movement. The recognisable configuration or pattern may comprise a symbol or graphic projecting from the surface of the indicator diaphragm. This facilitates observation on the outer surface of the display diaphragm if the symbol or graphic either abuts the inner surface of the display diaphragm or protrudes through the display diaphragm.

Alternatively, either the display diaphragm or, if present, the liquid or gel may be partially opaque. Upon relative movement between the diaphragms, the symbol or graphic which projects from the surface of the indicator diaphragm either appears or disappears or, alternatively, becomes more or less visible when viewed through the display diaphragm.

In order to indicate a range of pressure, it is necessary to define the two extremes of that range, i.e. a high pressure extreme and a low pressure extreme. Thus, it is preferable that the configuration or pattern comprises at least two components, each component corresponding to a different pressure.

Such components may project from the surface of the indicator diaphragm by different amounts, thereby abutting the display diaphragm at different pressures. Alternatively, the components may have different visibility such that they can become visible and invisible at different pressures, e.g. by having different colours or symbols and patterns.

The relative movement of the diaphragms may be accommodated where either diaphragm comprises a flexible polymer and especially an elastomer. The symbol or graphic may also comprise a flexible polymer or elastomer.

Where the indicator diaphragm is subjected to a higher pressure than the display diaphragm, it is preferable that the indicator diaphragm is impermeable so as to prevent leakage.

According to a second aspect of the present invention, apparatus comprises a fluid reservoir and a pressure indicator according to any preceding claim wherein one of the diaphragms is in fluid communication with the fluid reservoir. The apparatus may be an inflatable such as a tyre or a ball.

Th prssure indicator may be incorporat d in the surface of the fluid reservoir or, more conveniently housed in or around a valve assembly.

According to a third aspect of the present invention, a method of indicating either fluidic or mechanical pressure comprises the steps of applying a pressure to a pressure indicator, the indicator comprising a display diaphragm and an indicator diaphragm coupled to and in fluid communication with the display diaphragm; and observing the relative movement between the diaphragms caused by the pressure applied, either on the outer surface of the display diaphragm or through the display diaphragm.

Preferably, the indicator diaphragm bears a recognisable configuration or pattern such that the relative movement is observed either when the pattern or configuration abuts the display diaphragm, or when the pattern or configuration becomes visible through the display diaphragm.

In a preferred method, the pattern or configuration may comprise a symbol or graphic having at least two components where each component corresponding to a different pressure. This enables a pressure range to be defined whereby one of the components defines a lower relative pressure, the other a higher relative pressure.

BRIEF DESCRIPTION OF THE DRAWINGS

The invention will now be described, by way of example only, with reference to the figures in which:

FIG. 1 shows, schematically, a football having a pressure indicator according to the present invention;

FIG. 8 shoes a means to amplify the applied pressure according to the present invention.

DETAILED DISCUSSION OF EMBODIMENTS

FIG. 1 shows, schematically, a football 1 having a pressure indicator 2 according to the present invention. A valve 3 is positioned in the wall of the football, whereby, using conventional methods, the football can be inflated through the valve, e.g. by using a pump (not shown). The pressure indicator is exposed to both the internal pressure of the football and atmospheric pressure outside the football. It will be appreciated that there is an optimal range in which a football should be pressurised for bounce and control. Below this range, the football can be said to be under inflated and above, it can be said to be over inflated.

Figure 2A:
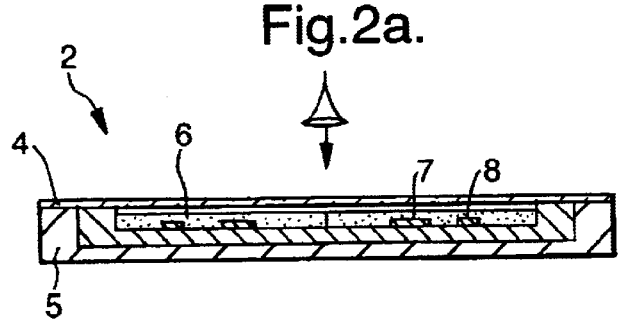
FIG. 2a shows a cross-section of the pressure indicator of FIG. 1 when the football is under inflated.

FIG. 2a shows a cross-section of the pressure indicator 2 when the football 1 is under inflated. The pressure indicator comprises a transparent display diaphragm 4 coupled to and in fluid communication with an indicator diaphragm 5. The diaphragms form a compartment 6. The surface of the indicator diaphragm has projecting therefrom a diamond symbol 7 and a cross symbol 8 where the diamond symbol projects further from the indicator diaphragm than the cross symbol. An opaque gel fills the remainder of the compartment. An example of a suitable gel is a silicone rubber although a person skilled in th art will be aware of other suitable materials.

Figure 2B:
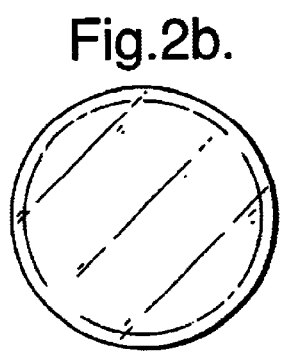
FIG. 2b shows the indication visible on the pressure indicator of FIG. 1 when the football is under inflated.

FIG. 2b (not to scale) shows the indication visible through the display diaphragm 4 of the pressure indicator 2 when the football 1 is under inflated. When under inflated, neither the diamond 7 or the cross 8 are visible though the display diaphragm 4 due to the opaqueness of the gel contained in the compartment i.e. they do not contact the indicator diaphragm.

Figure 2C:
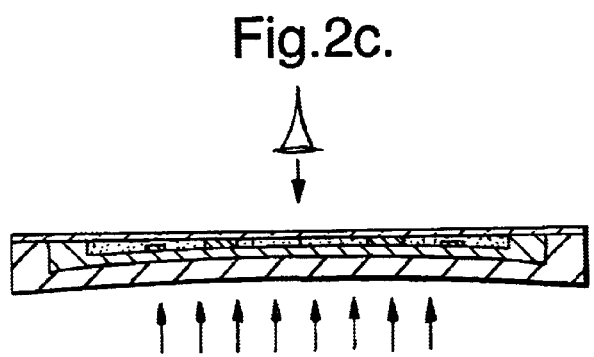
FIG. 2c shows a cross-section of the pressure indicator of FIG. 1 when the football is correctly inflated.
Figure 2D:
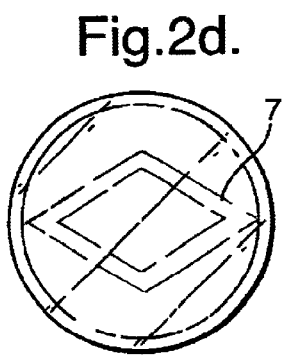
FIG. 2d shows th indication visible on the pressur indicator of FIG. 1 when the football is correctly inflated.

FIG. 2c shows a cross-section of the pressure indicator 2 when the football 1 is correctly inflated. Pressure is exerted on the indicator diaphragm 5 which is sufficient to cause the indicator diaphragm to depress, thereby allowing the diamond 7 (but not the cross 8) to abut the display diaphragm 4. When the diamond abuts the display diaphragm, the opaque gel is displaced such that the diamond becomes visible when viewed through the display diaphragm as shown in FIG. 2d (not to scale).

Figure 2E:
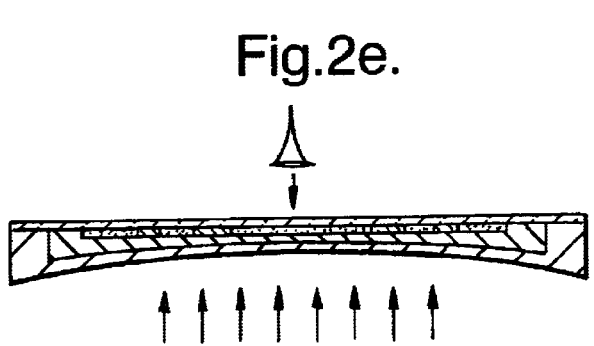
FIG. 2e shows a cross-section of the pressure indicator of FIG. 1 when the football is over inflated.
Figure 2F:
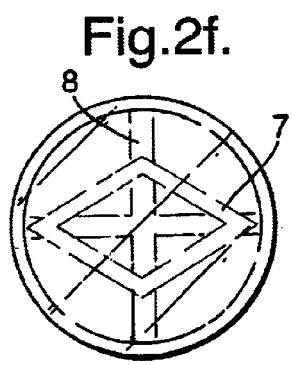
FIG. 2f shows the indication visible on the pressure indicator of FIG. 1 when the football is over inflated.

FIG. 2e shows a cross-section of the pressure indicator of FIG. 1 when the football 1 is over inflated. The pressure exerted on the indicator diaphragm is greater than that as shown in FIG. 2c resulting in greater relative movement between the diaphragms. As such, both the diamond and the cross abut the display diaphragm and thus become visible when viewed through the display diaphragm as shown in FIG. 2f (not to scale).

Figure 3A:
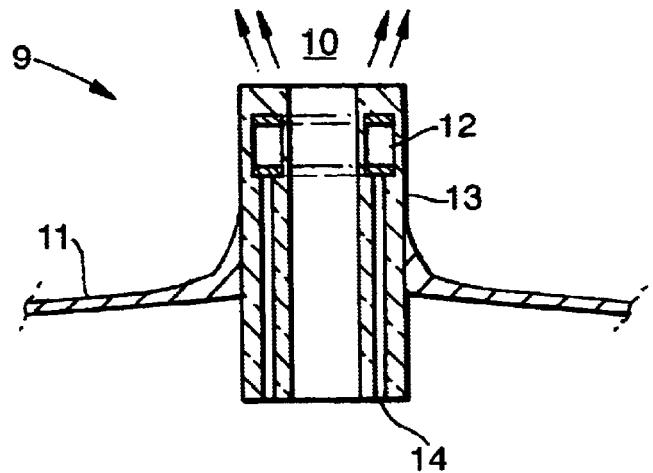
FIGS. 3a and 3b show, schematically, a valve having a pressure indicator according to the present invention.

FIG. 3a shows, schematically, a valve 9 having a pressure indicator 10 according to the present invention. In use, the valve is connected to an inflatable or inflated object 11. The indicator assembly 12 is positioned within the transparent valve casing 13 so as to be visible when viewed from above. The indicator assembly may also be viewed from the side. The pressure indicator is exposed to atmospheric-pressure and also the internal pressure of the object via the pressure equalisation channel 14.

The indicator assembly comprises an indicator diaphragm 122 which is responsive to changes in pressure via the pressure equalisation channel 14. The indicator diaphragm 122, on an increase in pressure, presses against the display diaphragm 121. The display diaphragm 121 may be made from a lenticular material such as is described in FIG. 4. When the correct pressure is communicated to the indicator diaphragm 122 via the pressure equalisation channel 14, the display is revealed. The indicator diaphragm 122 is annular in shape.

Figure 3B:
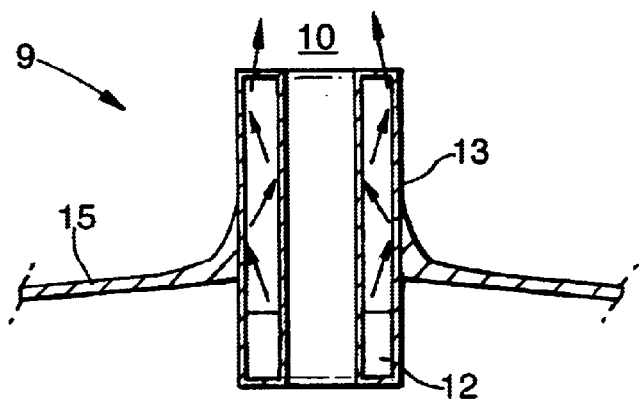
Figure 3C:
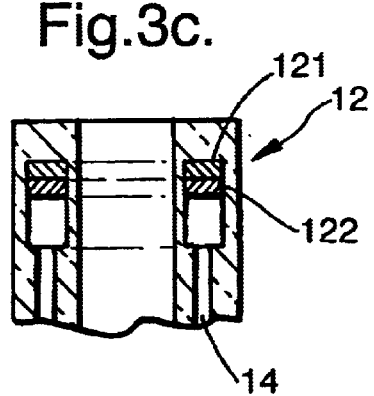
FIG. 3c shows a valve assembly suitable for use in a valve described in FIGS. 3a and 3b.

FIG. 3b shows a valve 15 having a pressure indicator 16 according to the present invention. In use, the valve is connected to an inflatable or inflated object 17. The indicator assembly 18 is positioned within the transparent valve casing 19, which acts as a guide to light entering the casing so the indication is visible when viewed from above. The indicator assembly may also be viewed from the side. The pressure indicator is exposed to both the internal pressure of the object and atmospheric pressure.

Figure 4A:
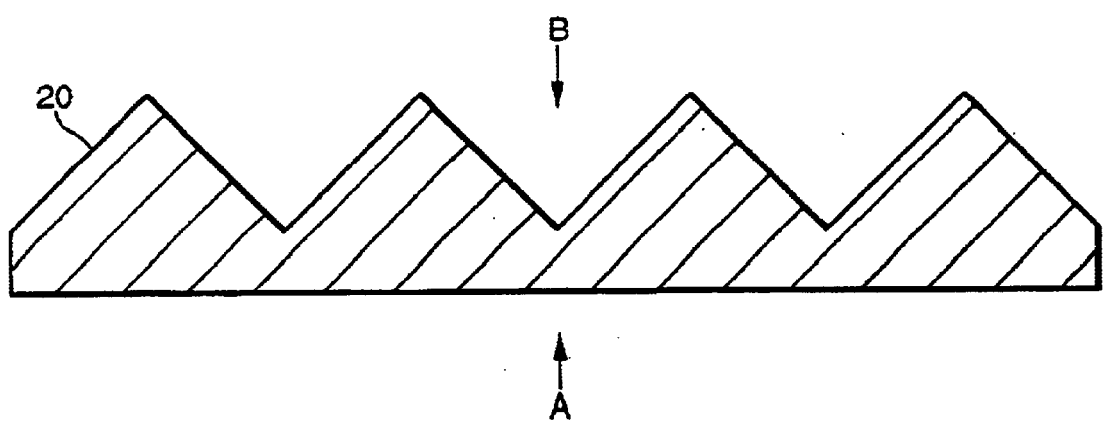
FIGS. 4a and 4b show a display diaphragm according to the present invention.

FIG. 4a shows a display diaphragm having a lenticular shape, 20. The diaphragm is manufactured by casting an elastomer, for example polydimethoxy siloxane (PDMS) in a master mould. The display surface is viewed from side A and when in an uncompressed state (as shown) the diaphragm appears silvery, as a result of the diffractive and reflective properties of the lenticular shape.

When a pressure is applied to the indicator diaphragm, it contacts the peaks of the display diaphragm from side B. As the pressure is increased, the indicator diaphragm compresses the lenticular shape, changing the diffractive and reflective properties of the display diaphragm. At a certain amount of compression, depending on the end use of the pressure indicator, the display surface becomes transparent revealing the image on the indicator diaphragm.

Figure 4B:

FIG. 4b shows a display diaphragm comprising three layers of lenticular material, 20. By using a layered structure, the amount of reflected light, when the diaphragm is uncompressed, is increased.

Figure 4C:
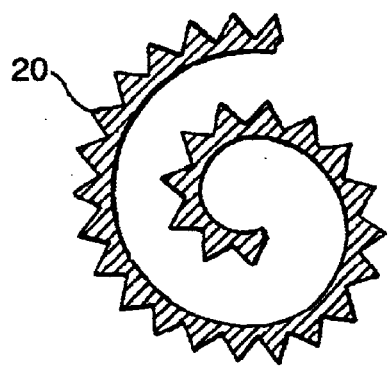
FIG. 4c shows an indicator diaphragm according to the present invention.

FIG. 4c shows an indicator diaphragm comprising lenticular material 20. In this example, the lenticular material is rolled up and inserted in a tube (the display diaphragm, not shown). The triangles may face inwardly or outwardly. In this case they face outwardly. One layer of the lenticular material may be used or, the indicator diaphragm may comprise a number of layers which can be made by creating a spiral of the indicator diaphragm prior to insertion into the tube. This example is particularly suitable for use in tyre valves.

Figure 5:
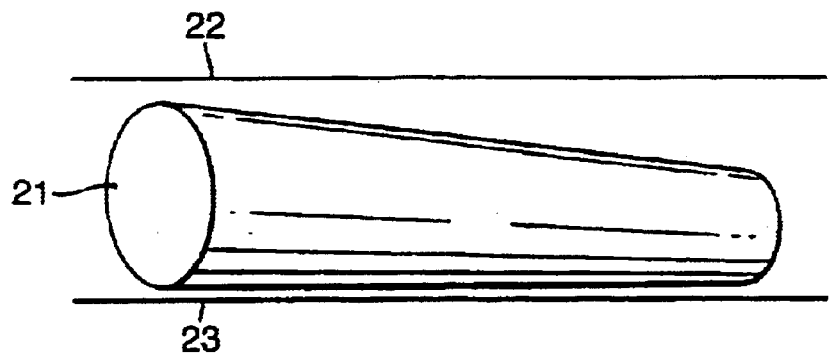
FIG. 5 shows a pressure indicator according to the present invention.

FIG. 5 shows a tap red tube of elastomeric material having a frosted outer surface, 21. The frosted surface is produced by grit blasting the surface of mould in which the tube is formed. The tube is placed between the display diaphragm, 22 and the indicator diaphragm, 23. When compressed, the tube becomes transparent. As the tube is tapered, the end of the tube having the largest diameter is compressed first so, the whole indicator diaphragm is revealed only when the whole tube is compressed i.e. when the applied pressure is sufficient to compress the end of the tube having the smallest diameter. This example is useful when there are upper and lower limits of acceptable pressure within a body in fluid communication with the indicator diaphragm.

Figure 6:
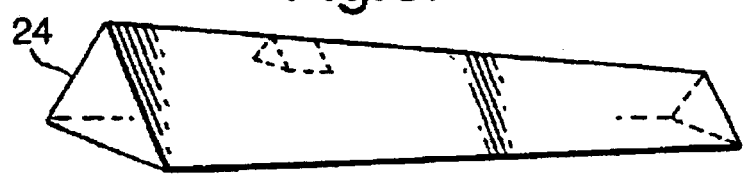
FIG. 6 shows a pressure indicator according to the present invention.

FIG. 6 shows that the tapered tube of FIG. 5 may be substituted with a tapered triangular elastomeric tube 24. Small sections of the tube may be removed providing a space between sections of the indicator diaphragm. This could be used to provide a clearer indication of the transition between for example too low a pressure and a pressure within acceptable limits.

Figure 7:
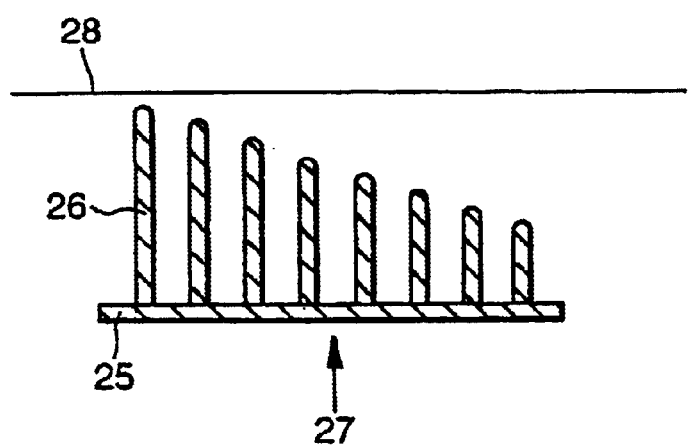
FIG. 7 shows a pressure indicator according to the present invention.

FIG. 7 shows an indicator diaphragm, 25 having projections, 26 of an elastomeric material. The projections are of graduated height. As the applied pressure to the indicator diaphragm is increased, 27 the projections press in turn against the display diaphragm, 28 producing first one dot and then a series of dots.

FIG. 8 shows a means for amplifying the pressure applied to the indicator diaphragm. A display diaphragm. 30 has a transparent region within it, 31. The indicator diaphragm, 32 is housed within a rigid plastic cup, 33 which is sealed to the display diaphragm and impermeable. Within the cup is a first circular surface, 34 in communication with a second larger circular surface, 35 via a rod, 36 which passes through the cup. The application of pressure to the second surface forces it down towards the cup. The force acting on the second surface is transmitted by the rod to the first surface and amplified by virtue of the different cross sectional or surface areas of the two surfaces. The amplification of the pressure depends on the ratio between the surface area of the two surfaces. The first surface will, at a predetermined pressure, contact the indicator diaphragm which becomes observable through the display diaphragm. A biasing means, 37 which in this case is an elastomeric foam block but, may be a spring, is placed between th second surface and the cup. When the applied pressure is removed, this foam forces the second surface back to its starting position.

What is claimed is:

1. A flexible pressure indicator, wherein the pressure indicator comprises:
   a flexible display diaphragm, and,
   a flexible indicator diaphragm bearing a recognizable configuration or pattern, wherein said display diaphragm and said indicator diaphragm, respectively, form first and second opposing outer surfaces of said pressure indicator, said diaphragms forming a compartment within said indicator, and wherein each of the outer surfaces of the pressure indicator is structured, in response to change in pressure, to cause relative movement between the diaphragms such that, at a certain degree of compression, the pattern or configuration on the indicator diaphragm becomes visible through the display diaphragm.

2. A pressure indicator as claimed in claim 1 further comprising a means to amplify the relative movement between the diaphragms which results from the change in pressure.

3. A pressure indicator as claimed in claim 2 wherein the means to amplify the change in pressure comprises
   an article having a first surface and a second surface, the second surface having a larger cross sectional area than the first surface;
   wherein the first surface is in fluid communication with one of the diaphragms and in use, a change in pressure applied to the second surface causes an amplified movement of the first surface.

4. A pressure indicator as claimed in claim 3 wherein the first surface comprises the indicator diaphragm.

5. A pressure indicator as claimed in claim 3 further including a rigid structure and means for biasing the second surface against the rigid structure.

6. A pressure indicator as claimed in claim 5 wherein the biasing means comprises one of a spring and elastomeric material.

7. A pressure indicator as claimed in claim 1 wherein the display diaphragm is transparent.

8. A pressure indicator as claimed in claim 1 wherein the compartment contains a liquid or gel.

9. A pressure indicator as claimed in claim 8 wherein the liquid or gel is at least partially opaque.

10. A pressure indicator as claimed in claim 1 wherein the recognisable configuration or pattern comprises a symbol or graphic projecting from the surface of the indicator diaphragm towards the display diaphragm.

11. A pressure indicator as claimed in claim 1 wherein the configuration or pattern comprises at least two components, each component contacting the display diaphragm at different pressures.

12. A pressure indicator as claimed in claim 11 wherein the at least two components have different colours.

13. A pressure indicator as claimed in claim 11 wherein the at least two components have different visibility.

14. A pressure indicator as claimed in claim 1 wherein at least one of the display diaphragm and the indicator diaphragm comprises a flexible polymer.

15. A pressure indicator as claimed in claim 14 wherein at least one of the display diaphragm and the indicator diaphragm comprises an elastomer.

16. An apparatus comprising a fluid reservoir and a pressure indicator according to claim 1 wherein one of the diaphragms is in fluid communication with the fluid reservoir.

17. An apparatus according to claim 16 wherein the apparatus is inflatable.

18. A method of indicating fluidic or mechanical pressure using a pressure indicator according to claim 1.

19. A ball comprising a pressure indicator as claimed in claim 1.

20. A pressure indicator as claimed in claim 1 wherein the display diaphragm comprises a lenticular material that, upon a certain amount of compression, becomes transparent to reveal the image on the indicator diaphragm.

21. An inflatable object comprising a pressure indicator as claimed in claim 1.

22. A pressure indicator comprising:
    a display diaphragm; and
    an indicator diaphragm, said indicator diaphragm coupled to and in communication with the display diaphragm, wherein the display diaphragm comprises a compressible lenticular material and the indicator diaphragm bears a recognizable configuration or pattern, and wherein a change in pressure applied to at least one of said diaphragms causes relative movement between the diaphragms, thereby compressing the lenticular shape of said lenticular material to change the diffractive and reflective properties of the display diaphragm, thus causing an image of said recognizable configuration or pattern to be externally visible through said display diaphragm.

* * * * *